United States Patent [19]

Eilers et al.

[11] Patent Number: 4,688,246

[45] Date of Patent: Aug. 18, 1987

[54] CATV SCRAMBLING SYSTEM WITH COMPRESSED DIGITAL AUDIO IN SYNCHRONIZING SIGNAL INTERVALS

[75] Inventors: Carl G. Eilers, River Forest; Ronald B. Lee, Chicago; Rudolf Turner, Vernon Hills, all of Ill.

[73] Assignee: Zenith Electronics Corporation, Glenview, Ill.

[21] Appl. No.: 811,928

[22] Filed: Dec. 20, 1985

[51] Int. Cl.⁴ .............................................. H04N 7/167
[52] U.S. Cl. ........................................ 380/9; 380/10; 380/15; 380/19; 375/110
[58] Field of Search ................... 358/120, 121, 114; 375/110, 58, 51; 179/1.5 S, 1.5 R

[56] References Cited

U.S. PATENT DOCUMENTS

| | | | |
|---|---|---|---|
| 3,838,214 | 9/1974 | Lind | 375/110 |
| 3,876,833 | 4/1975 | Breant | 375/110 |
| 4,010,421 | 3/1977 | Lind | 375/110 |
| 4,244,047 | 1/1981 | Perkins | 375/51 |
| 4,266,243 | 5/1981 | Shutterly | 358/121 |
| 4,336,553 | 6/1982 | den Toonder et al. | 358/120 |
| 4,353,088 | 10/1982 | den Toonder et al. | 358/120 |
| 4,424,532 | 1/1984 | den Toonder et al. | 358/120 |
| 4,600,941 | 7/1986 | Sakamoto et al. | 358/121 |
| 4,608,456 | 10/1986 | Paik et al. | 179/1.5 S |

Primary Examiner—Stephen C. Buczinski
Assistant Examiner—Melissa L. Koltak

[57] ABSTRACT

A CATV television system has the sync and color subcarrier reference information replaced in the horizontal blanking intervals with compressed digital audio data. The digital audio data is in the form of a modified duobinary signal having data sampling points selected to coincide with the zero crossings of a color reference subcarrier. A phase locked loop provides the master clock for the signal generator and the data sampler. A horizontal interval detector circuit recovers a 1.8 MHz CW signal of greater than one half line duration, followed by a white horizontal identification pulse of 4.7 microseconds width, that are supplied in place of the pre-equalizing, vertical sync and post equalizing pulses in the vertical interval. CODE 1TV60CATV 28 Claims, 11 Drawing Figures

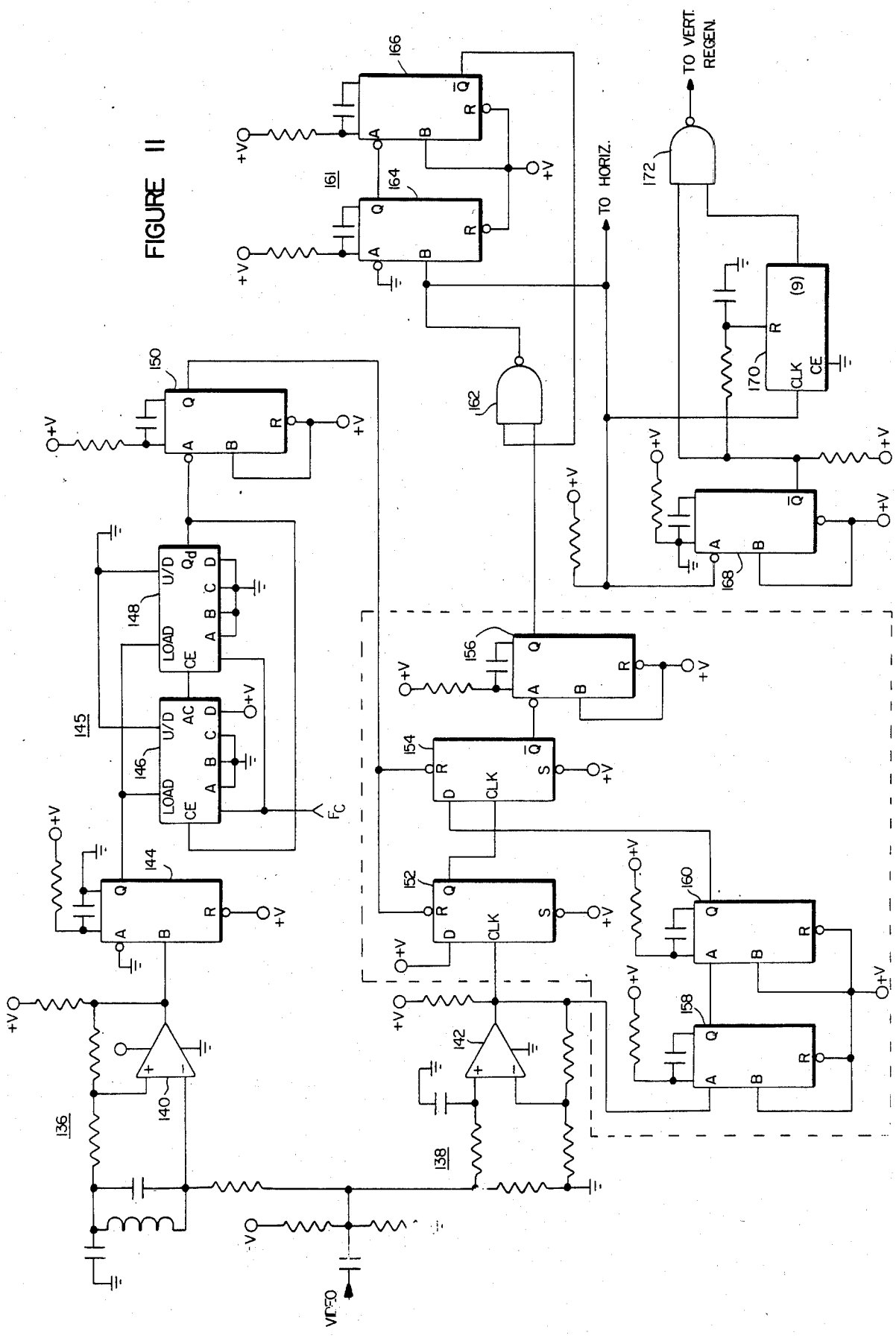

CATV SCRAMBLING SYSTEM WITH COMPRESSED DIGITAL AUDIO IN SYNCHRONIZING SIGNAL INTERVALS

BACKGROUND OF THE INVENTION

This invention relates generally to transmission systems and particularly to CATV transmission systems that have encoded video signals and that also transmit digital audio information. In a broader aspect, the invention envisions a signal formatting method having decided benefits and the appropriate transmitting and receiving apparatus therefor.

In CATV systems, scrambling or encoding of the transmitted television (TV) signal is common to prevent unauthorized use of the signals. Signal scrambling may take many forms, including random video inversion and deletion of synchronizing signals. The means for scrambling and recovering (or decoding) scrambled TV signals are well known in the art.

One popular form of encoding involves suppressing or deleting the information in the horizontal interval of the TV signal. That information consists of the horizontal sync pulse, and in a color signal, the reference color burst. The TV signal may be subjected to further scrambling by video inversion to assist a CATV operator in maintaining the security of his signal transmission. The advent of high quality stereo television broadcasting and third channel audio for foreign language transmissions, commonly referred to as SAP, has also given rise to a need to supply such information to CATV subscribers, preferably on a premium basis.

So-called digital audio has recently emerged as a means for providing high quality audio transmission because of its inherent immunity to noise. A digital audio signal is formed by dividing an analog audio signal into a fixed number of discrete amplitude levels, sampling the analog signal and generating a binary representation of the various levels of the sampled signal. Because of the nature of binary transmission and because of the discrete amplitude levels, any noise or deterioration experienced by the signals in transmission is readily eliminated. There are also techniques for compressing digital audio signals to facilitate data transfer in a limited bandwidth without sacrificing audio quality.

As in any digital data transmission system, reliable data recovery requires the recovery of a reliable data clock. To recover the clock, it is common practice to use either a self-clocking code or a clock run-in. These methods utilize time multiplexing of data and clock and thus reduce the available data rate. In its broad aspect, the invention enables efficient transmission of both the digital data and a clock reference which can be used to derive the data clock. This is accomplished by summing the two signals in an exact phase relationship such that separation of the data and clock reference is not necessary at the receiver before data slicing. Because of the use of frequency multiplexing, the clock reference can be recovered at the receiver with a phase-locked loop (PLL). In particular, the continuous wave (CW) clock reference is added to the digital data such that the zero crossings of the clock reference coincide with the data sampling points of the digital data. Since the CW clock reference signal has no amplitude at the sampling points of the data, separation of the CW clock reference is not necessary at the receiver before data slicing. The presence of the CW clock reference does not affect "eye height". In addition, the digital data may be pre-coded to redistribute the data energy away from the clock reference frequency to further improve the performance of the system.

In a specific aspect of the invention, efficient transmission of digital audio in a TV signal scrambling system is enabled by replacement of the information in the horizontal sync interval with pre-coded digital audio information and a clock reference, which is also used as a color burst for color television transmissions. The digital audio data is compressed to reduce its bit rate, pre-coded using either modified duobinary or duobinary and sent with a data rate of 2 Fc. A clock reference of Fc isused, where Fc is equal to the standard NTSC color burst frequency of 3.58 MHz. The pre-coded data and the color burst are inserted into the horizontal interval of a television signal on a pedestal of 50 IRE units. For duobinary pre-coding, a blank time interval is left in the horizontal interval during which no data is sent to provide a fixed 50 IRE level for automatic gain control (AGC) circuits in the receiver to use as a reference.

When modified duobinary pre-coding is used, two extra bits are added at the end of the data burst for DC balance. The nature of modified duobinary pre-coded data is such that the DC average of a burst of pre-coded data may always be made zero with the addition of two bits. This obviates the need for a blank time interval because the receiver AGC circuits may use the average level of the horizontal interval as its fixed reference. Thus the entire horizontal interval may be occupied by the pre-coded data and clock reference except for short front and back porch periods that separate the data from the video information. The two DC balance bits at the end of the data burst contain no digital audio information and are ignored by the audio decoder in the television receiver.

OBJECTS OF THE INVENTION

A principal object of the invention is to provide a novel signal formatting system and method.

A further object of the invention is to provide a novel CATV encoder.

Another object of the invention is to provide a scrambled CATV system with digital audio information.

A further object of the invention is to provide an improved CATV encoder with digital audio.

Still another object of the invention is to provide a novel CATV decoder.

BRIEF DESCRIPTION OF THE DRAWINGS

Other objects and advantages of the invention will be apparent upon reading the following description in conjunction with the drawings in which:

FIG. 11 is a schematic diagram of the horizontal interval detector of FIG. 10.

DESCRIPTION OF THE PREFERRED EMBODIMENTS

Figure 1:
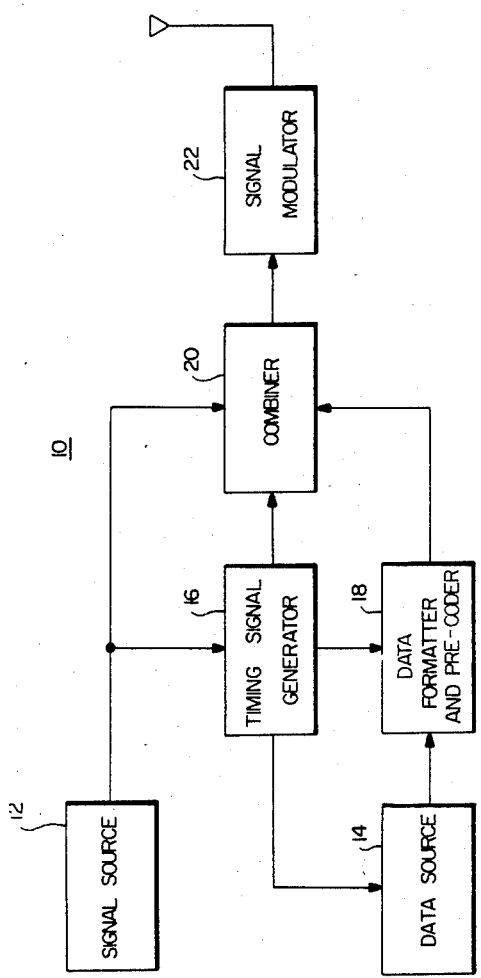
FIG. 1 is a simplified block diagram of an encoder for formatting signal and data in accordance with the broad aspect of the invention.

FIG. 1 illustrates an encoder 10 for formatting two signals in accordance with the broader aspects of the invention. A signal source 12, which comprises a source of a CW clock signal, and a data source 14, which comprises a source of binary coded digital data, are provided. Signal source 12 is connected to a timing signal generator 16, for producing the requisite timing or clocking signals for encoder 10. Data source 14 is controlled by timing generator 16 to supply information to a data formatter 18 (which may include an optional pre-coder), that is also under control of timing generator 16. The output from formatter 18 is supplied to a combiner 20, where, under control of timing generator 16, the CW clock signal from signal source 12 and the formatted data from formatter 18 are combined. Specifically, the signals are combined such that the data sampling points of the output of formatter 18 only fall upon zero crossing points of the CW clock signal. Consequently, the amplitude of the CW signal is always zero at the data sampling points and the two signals may be readily separated in the receiver. The signals, interleaved as just desribed, are applied to a signal modulator 22 for transmission.

Figure 2:
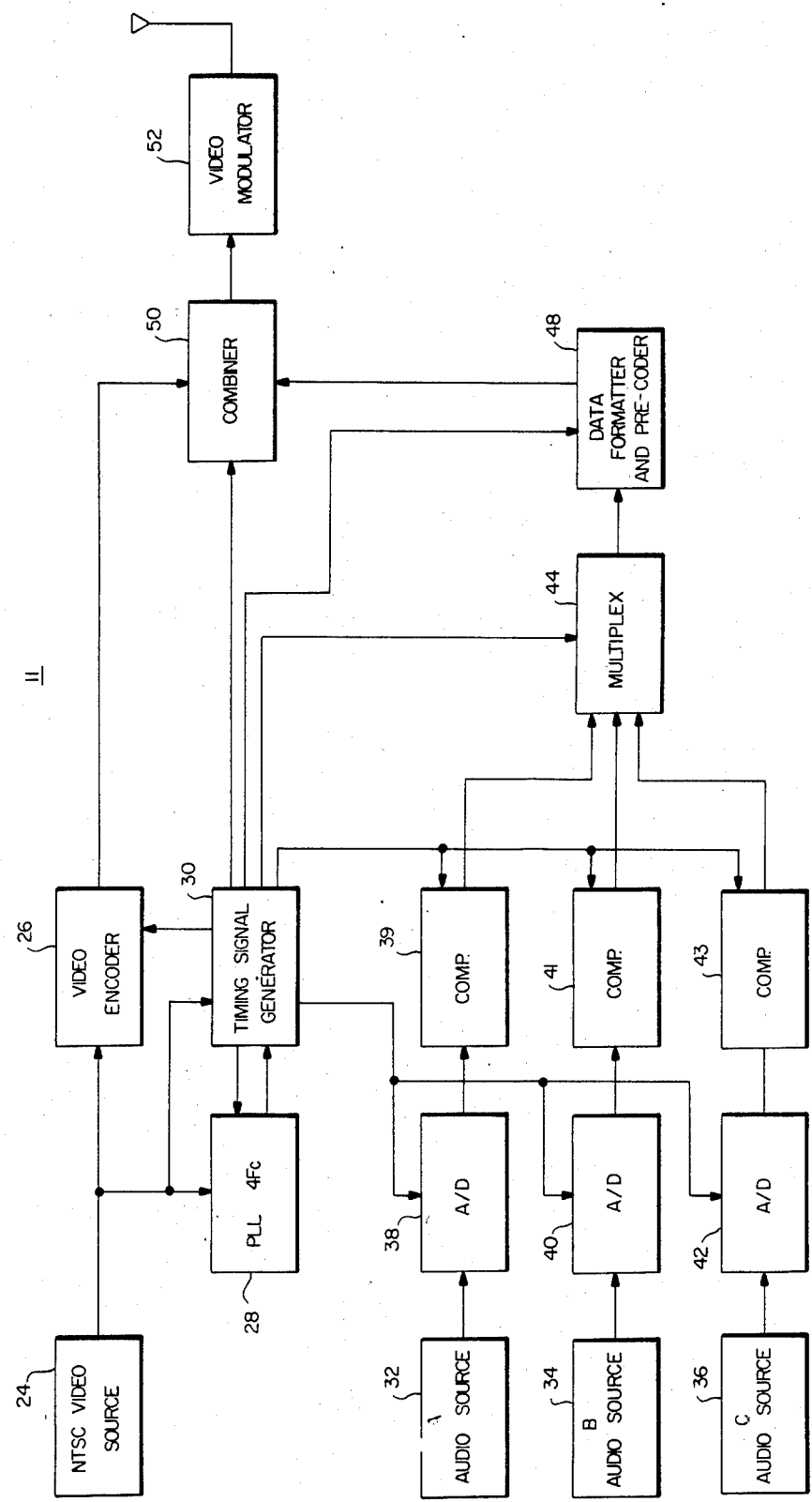
FIG. 2 is a simplified block diagram of a CATV signal encoder of the invention.

In FIG. 2, a specific implementation of the invention is shown. An ecoder 11 includes a source of NTSC baseband video information 24 supplying a video encoder 26, a PLL 28 and a timing signal generator 30. Video encoder 26 may comprise any of a well known number of means for encoding the video information, such as by random inversion. The PLL may comprise any well known circuit for maintaining a fixed frequency phase locked to the color burst of the incoming video signal and, as indicated, is preferably operated at a frequency of 4 Fc where Fc is equal to the frequency of the color subcarrier in a standard NTSC TV signal. The 4 Fc output of PLL 28 is supplied to timing signal generator 30 which includes well known digital means for generating horizontal and vertical rate signals.

Three sources of analog audio signals A, B and C, identified by references 32, 34 and 36, respectively, individually supply analog to digital (A/D) converters 38, 40 and 42. Audio signals A and B may be TV stereo signals and audio signal C may be a separate TV audio signal such as a foreign language accompaniment. The outputs of the A/D converters are supplied to three audio data compression circuits 39, 41 and 43, which are under control of timing signal generator 30. They, in turn, supply a multiplexer 44 which produces a time division multiplexed digital audio signal. A formatter and pre-coder 48, which is also under the control of timing signal generator 30, takes the output of multiplexer 44 and develops pre-coded compressed digital audio data combined with a CW color burst, which is later inserted into the TV signal horizontal interval in a combiner 50. The CW color burst serves both as the subcarrier reference and the data clock reference in the receiver/decoder described later. The purpose of formatter and pre-coder 48 is to deliver pre-coded digital audio data to combiner 50 only during the horizontal interval with a bit rate equal to 2 Fc, where it is summed with a color subcarrier burst having a frequency of Fc, such that the data sampling points coincide with the zero crossings of the color burst. The coincidence of the zero crossings of the color burst and data sampling points of the digital audio data enables the audio data to be separated from the color burst without requiring a filter at the color subcarrier frequency since the color burst amplitude is at zero at the data sampling points. It will be appreciated that the data bit rate during the horizontal interval need not be 2 Fc, but may be 2 Fc/N where N is an integer, and the signals are phased such that the data sampling points occur at zero crossings of the color burst. When N equals 1 and compressed digital audio data is pre-coded in a duobinary format, a very efficient system results.

The output of video encoder 26 and formatter and pre-coder 48 are supplied to combiner 50 which, under the control of timing signal generator 30, produces an output for a video modulator 52. The output of combiner 50 comprises a scrambled NTSC TV signal with the horizontal information in the form of pre-coded compressed digital audio and a CW color burst. The video modulator 52 modulates the output of combiner 50 onto an RF carrier for transmission.

Figure 3:
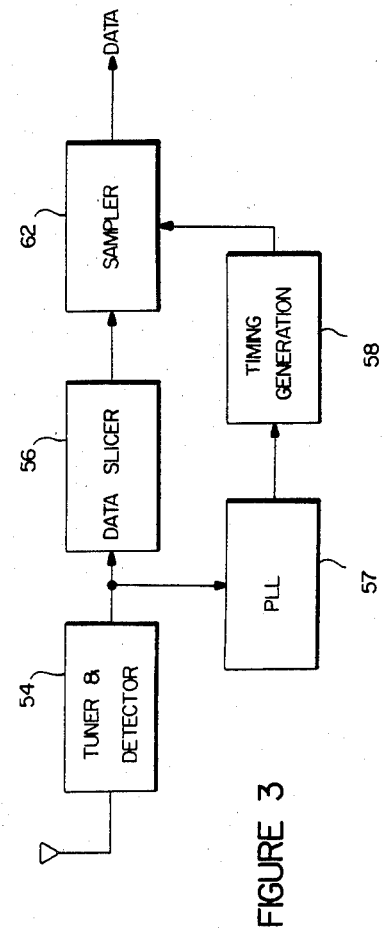
FIG. 3 is a simplified block diagram of a decoder for operation with the encoder of FIG. 1.

FIG. 3 represents a block diagram of a decoder for recovering the CW signal and interleaved data from the signal transmitted by the encoder of FIG. 1. A tuner and detector 54 receives and detects the transmitted signal and supplies it to a data slicer 56 and to a PLL 57. PLL 57 supplies a regenerated CW signal locked to the incoming clock reference to a timing generation circuit 58 which includes well known means for generating a CW signal corresponding to that from signal source 12 in FIG. 1. Data slicer 56 is also conventional and assures that the pulse information representing the binary encoded data is of proper amplitude for a sampler 62, which is also under control of timing generator 58. For duobinary or modified duobinary pre-coding, data slicer 56 may consist of two comparators whose outputs are supplied to an OR gate. The data from data source 14 in FIG. 1 is recovered by sampling the detected and "sliced" signal at the clock frequency used to format the signals in the encoder. Since the signals were formatted such that the data sampling points occur only at zero crossings of the CW signal, the data signal is readily extracted without the need for a filter to remove the CW signal frequency.

Figure 4:
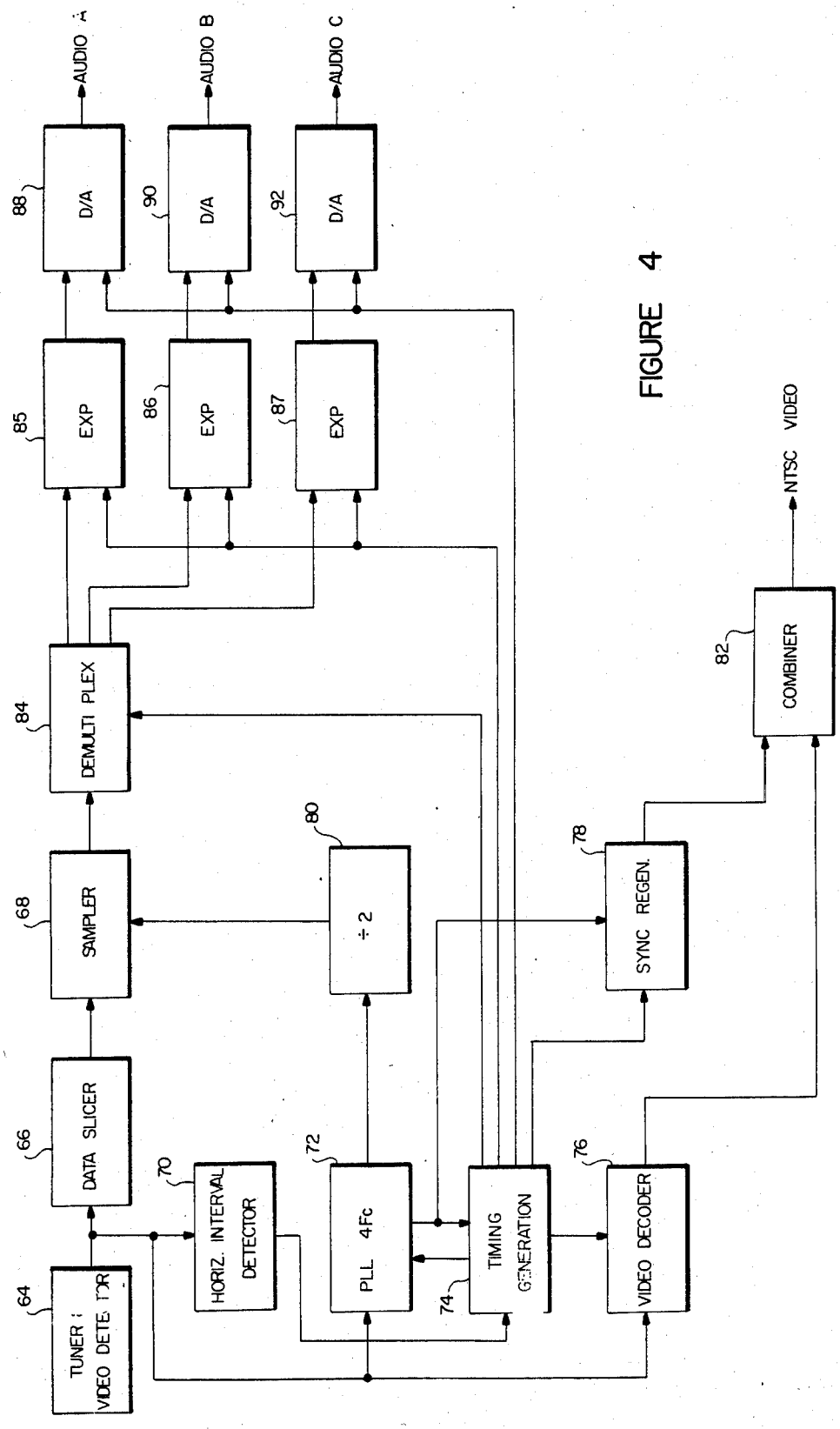
FIG. 4 is a simplified block diagram of a decoder for operation with the encoder of FIG. 2.

FIG. 4 is a simplified block diagram of a decoder for recovering the encoded TV signal and data transmitted by the encoder of FIG. 2. A tuner and video detector 64 receives and detects the transmitted TV signal and supplies it to: a data slicer 66, the output of which feeds a sampler 68; a horizontal interval detector 70 (HI70) for determining when the sync intervals in the received TV signal occur; a PLL 72; and a video decoder 76 for "undoing" any video inversion or scrambling that may have been imposed at the encoder. The horizontal interval detector is also novel and will be explained in connection with FIGS. 8–11 below. Suffice it at this point to say that HI70 provides information about the horizontal intervals for the timing generation circuit 74 which operates at a frequency of 4 Fc (four times the frequency of the color reference subcarrier).

PLL 72 is a narrow band PLL and contains a crystal voltage controlled oscillator. PLL 72 is locked to the Fc color burst which has been added to the pre-coded data in the horizontal interval in the encoder. Gating pulses for PLL 72 come from timing generation circuit 74. Upon initial start up, before PLL 72 is locked, gating pulses from timing generation circuit 74 may gate PLL 72 incorrectly. However, even without lock of PLL 72, the HI70 operates and provides information to the timing generation circuit 74 for phasing it to the incoming video. When this occurs, PLL 72 will properly lock to the Fc color burst during the horizontal interval. Timing generation circuit 74 consists of digital counters counting 4 Fc clock pulses from PLL 72 which are decoded for generating various timing pulses. Horizontal phasing of the timing generation circuit 74 by HI70 is accomplished by changing the count of the counters and thereby slipping the phase of the decoded outputs. The amount by which the count of the counters is changed and the duration determine the rate at which timing generation circuit 74 can be phased. When the system is locked, this rate is kept low to provide noise immunity. Vertical phasing of the timing generation circuit 74 is accomplished by resetting the vertical rate counters in timing generation circuit 74 in response to an output from HI70.

Timing generation circuit 74 supplies a video decoder 76 for decoding the video signal encoded by video encoder 26 in FIG. 2. Clock pulses from PLL 72 are supplied to a divider 80 which divides-by-two and supplies a 2 Fc clock to sampler 68. PLL 72 also supplies a 4 Fc clock to a sync regenerator 78 which also receives timing signals from timing generation circuit 74. Video decoder 76 and sync regenerator 78 are both well known in the art and need no further discussion herein. These circuits together supply a combiner 82 for recovering the originally transmitted video information from video source 24 in FIG. 2. The output of combiner 82 will be standard NTSC video with all standard synchronizing pulses and color bursts restored.

Sampler 68 is operated at twice the color subcarrier frequency to detect the data that was substituted in the horizontal interval. As seen in FIG. 2, the data comprises multiplexed and compressed digital audio. Therefore, a demultiplexer 84, three expanders 85, 86 and 87 and three D/A converters 88, 90 and 92 are operated, under control of timing generation circuit 74 for recovering the original audio signals A, B and C.

Figure 5:
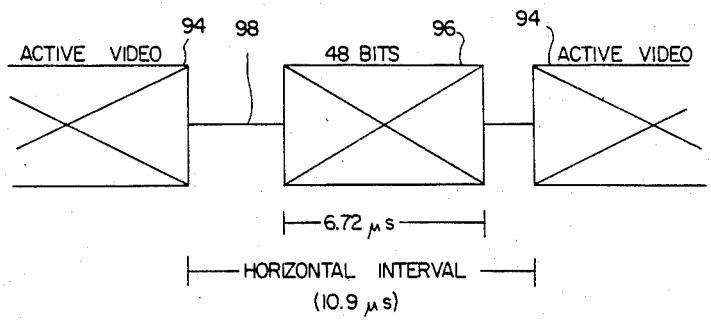
FIG. 5 indicates the information carried in the horizontal sync interval of a TV signal that is formatted in accordance with the invention.
Figure 6:
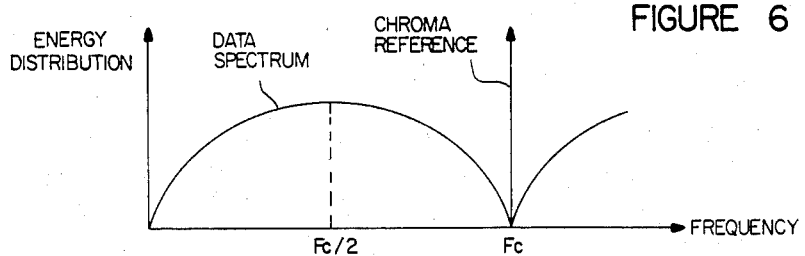
FIG. 6 is a graph showing the energy distribution of the information in the TV signal horizontal blanking interval.
Figure 7:
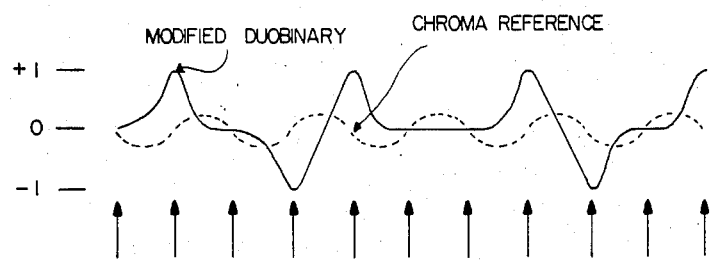
FIG. 7 shows the phasing of the modified duobinary signal and the color subcarrier reference.

Reference to FIGS. 5, 6, and 7 indicates the manner in which the horizontal interval signal is formatted and pre-coded to enable elimination of a color reference frequency filter circuit before audio data separation. It will be appreciated that for the broader aspect of the invention, the signal pre-coding is done in a non-TV environment and there is no need for substituting of information in horizontal blanking intervals. the discussion of the TV embodiment of the invention, however, will also be seen to apply to the more general aspect of the invention.

The baseband video signal has a horizontal blanking interval that is stripped of the normal sync and color burst information. In its place is pre-coded compressed digital audio data interleaved with a color burst. When duobinary pre-coding is used, a reference level is also inserted for AGC purposes. As seen in FIG. 5, the active video portions 94 are separated by the standard NTSC horizontal interval of 10.9 microseconds. During this interval a DC level 98 corresponding to 50 IRE units for AGC is inserted. This is only needed with duobinary pre-coding a 6.72 microsecond segment 96 of compressed digital audio and color burst, that comprises 48 bits of data, is also inserted in the horizontal interval. The data inserted has been subjected to duobinary or modified duobinary pre-coding with a 2 Fc data rate which removes the Fc component from the data. The color subcarrier amplitude at the data sampling points is made zero by using a 2 Fc data rate and phasing with respect to the color subcarrier. The preferred embodiment uses a duobinary data format in which the binary data is "+1", "0" or "−1". As is well known, the "+1" and "−1" information is later converted to the same sign in the receiver, but the net result is that twice the data may be transmitted within the same bandwidth required by the conventional "+1" and "0" binary transmission method.

FIG. 6 shows the energy distribution of the interleaved data and clock reference at Fc when modified duobinary pre-coding is used with a data rate of 2 Fc. The pre-coding redistributes the data energy away from DC and Fc. The absence of energy at DC guarantees that the data does not change the average level of the horizontal interval and the absence of energy at Fc allows the transmission of a color burst at this frequency which is used as both a clock reference and a color subcarrier reference. With duobinary pre-coding, the energy distribution is similar except that energy exists at DC, which means that the average level of the horizontal interval will change with data and it is necessary to send a fixed AGC reference level.

FIG. 7 illustrates the phasing between the modified duobinary data and the color subcarrier reference which is summed with it. The zero crossings of the color subcarrier reference shown by the dashed line is phased to correspond to the sampling points of the data. Arrows denote these sampling points. The color subcarrier reference has zero amplitude at the sample data points and consequently no subcarrier filter is required prior to separation of the data in the receiver. The arrangement enables a low cost system for receiving and decoding digitally compressed audio in a scrambled CATV system. In the preferred embodiment using data compression techniques, three audio channels may be accommodated with a bit allocation of 12 bits per channel; 7 bits for error correction, 2 bits for data/addressing purposes, 1 start bit and 2 bits for DC balance. Thus a total of 48 bits are used in the system of the invention.

It should be noted that the system is not limited to 48 bits and that a greater or lesser number of bits may be transmitted. The maximum number is limited by the duration of the horizontal blanking interval. I some CATV systems, it is possible to increase the duration of the horizontal blanking interval and thus accommodate more bits. It will be understood that the two DC balance bits are only included with modified duobinary pre-coding and a receiver designed to develop AGC during the horizontal interval based upon the average level of areas that include data. The balance bits are needed despite the fact that, in general, the modified duobinary pre-coded data has no DC energy. This is because when precoded data is not sent continuously but instead is "bursted", as during the horizontal interval, the DC average of the single burst is not necessarily zero. In fact, a burst of any number of bits of pre-coded data may have a DC component which can always be cancelled by the addition of these two bits. When data which has been pre-coded using modified duobinary is bursted, a choice may be made as to the polarity of the first bit, that is it may be either +1 or −1. When using modified duobinary pre-coding with the added two DC balance bits, so that the receiver may AGC in the presence of data, it is desirable to have the first bit start with equal probability in either polarity. This can be accomplished by artificially alternating the polarity of the first bit of the data burst between +1 and −1 during successive horizontal intervals.

In most TV scrambling systems, regular horizontal syncs are generally transmitted during all or, at least some portion of, the vertical interval. These horizontal syncs facilitate restoration of the synchronizing signals which are suppressed during the video portions. In the preferred embodiment, none of the horizontal synchronizing signals are present because color bursts and encoded digital audio data are substituted in each line to avoid any gaps in the audio data. Thus, no sync signals are present in the scrambled TV signal to facilitate restoration.

A novel interval detector has therefore been developed for use with the preferred embodiment of the invention. Detection is based upon supplying an identification signal of known characteristics that may be detected and separated apart from conventional video (and noise) signals. The identification signal is inserted in the vertical interval such that it will not interfere with other special signals, such as those used for teletext services and captioning, that are transmitted during the vertical blanking interval. Of all of the lines in the vertical blanking interval, the nine least likely to be used for special signals are the ones on which the pre-equalizing pulses, the vertical sync pulses and the post-equalizing pulses are sent. The identification signal which consists of a white pulse of 4.7 microseconds duration on a black pedestal is transmitted on these nine lines. A short duration white pulse was chosen to minimize buzz into the audio (if conventional FM audio is transmitted), which is more likely to be generated with white areas than black areas. To assure that the identification pulse is detectable with a high degree of accuracy, it is preceded by a CW signal that is very unlikely to occur in normal video. The CW signal selected has a frequency of 1.8 MHz and persists for 34.6 microseconds. Large amounts of 1.8 MHz energy are rare in video and having such energy persist for over a half a horizontal line is extremely rare. (Its video counterpart is half a screen of narrow stripes.) To differentiate between the even and odd vertical fields, one field includes six lines of 1.8 MHz signal followed by an identification signal and the other field has nine lines so formatted. With these signal selections, a detection circuit was developed for recovering signals that may be used to develop correctly timed horizontal and vertical sync signals.

Figure 8:
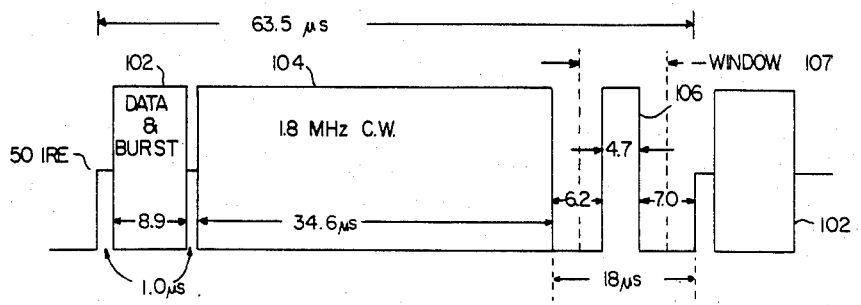
FIG. 8 illustrates one line in the vertical interval bearing a special CW and identification signal used for detecting the horizontal intervals.

In FIG. 8, one of the nine lines carrying the CW signal and identification signal is shown for one of the vertical fields. The line is 63.5 microseconds in duration, corresponding to a conventional horizontal line, and is identified by reference numeral 100. The data and burst portion 102 is shown as 8.9 microseconds in duration and is centered about a DC level of 50 IRE units with approximately 1 microsecond of no signal on either side. This corresponds to that described in connection with the scrambled signal in the horizontal interval in the decoder of FIG. 4. Portion 102 is followed by 34.6 microseconds of 1.8 MHz CW signal 104. Following the 1.8 MHz CW signal 104, an 18.0 microseconds black pedestal is transmitted with the 4.7 microseconds wide white identification pulse 106 occurring 6.2 microseconds from the beginning of the pedestal. The peak to peak amplitude of the white pulse has been chosen to be approximately 80 IRE. The dashed lines on either side of identification pulse 106 delineate a window 107 which represents the time period during which the identification pulse will be "looked for" by the detection circuitry in the receiver. The window 107 is opened upon detection of the 1.8 MHz CW signal 104.

Figure 9:
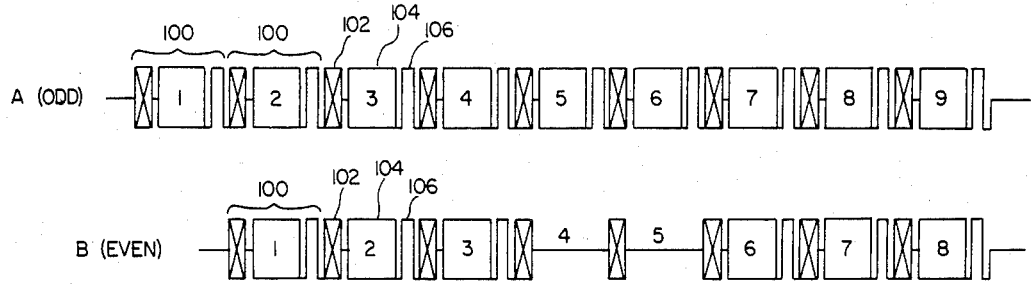
FIG. 9 is a pair of curves showing odd and even field identification.

In FIG. 9, curve A represents the first nine lines of an odd vertical field and curve B represents the first eight lines of an even vertical field. Together, both fields constitute one frame of a television picture. Curve A has nine lines 100, each of which includes a data and burst portion 102, a CW signal 104 and an identification pulse 106, while in curve B only six of the lines include CW signal 104 and identification pulse 106. All lines include a data and burst section 102, thus assuring that no gaps will occur in the audio data. The difference in number of horizontal lines in curve B is due to the interleaving of the two fields. The odd vertical field may be identified by the presence of nine identification pulses 106 and the even field identified by the presence of six identification pulses 106.

Figure 10:
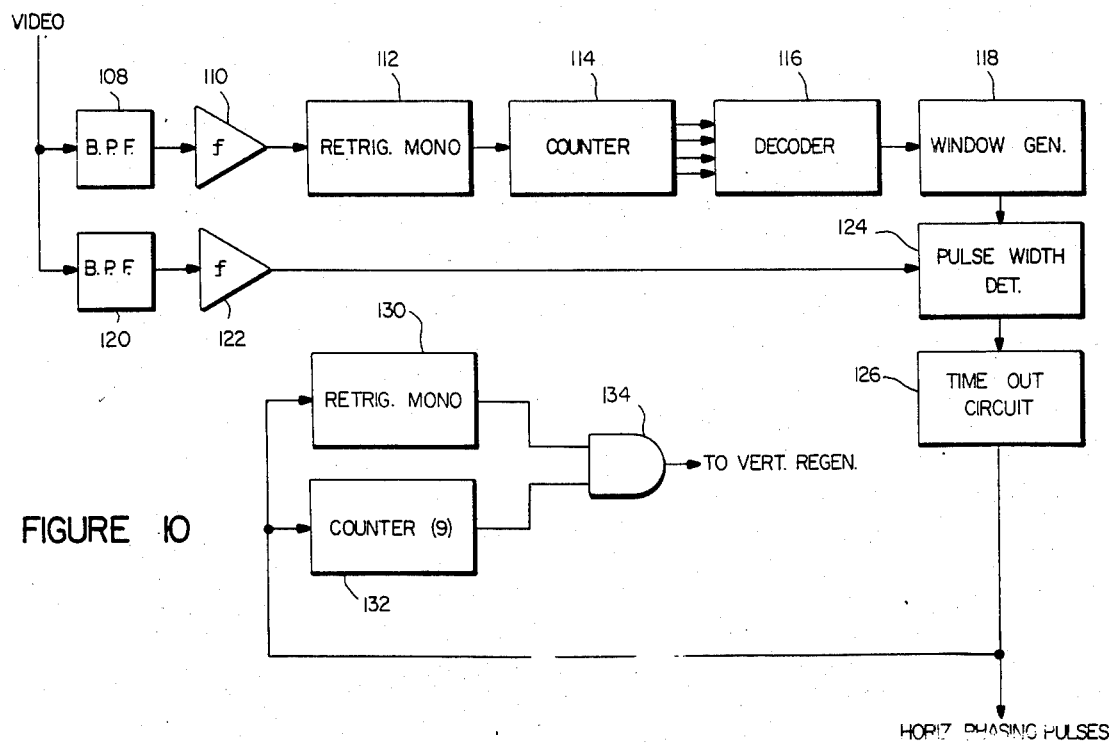
FIG. 10 is a block diagram of the horizontal interval detector of FIG. 4.

In FIG. 10 a block diagram illustrating a circuit for detecting the sync signal interval is shown. The video information is supplied to a bandpass filter (BPF) 108 which in turn feeds a comparator 110. BPF 108 passes energy around 1.8 MHz. Comparator 110 is included to shape the incoming pulses and functions as a slicer. This arrangement effectively renders the circuit independent of most signal level variations and avoids the problems of an AGC dependent detector. Comparator 110 supplies a retriggerable monostable 112. The retriggerable monostable has a 1.5 micorseconds pulse width and, in the presence of the 1.8 MHz CW signal, remains "on" to produce a single pulse that extends for approximately the duration of the 1.8 MHz CW signal. The output of monostable 112 is supplied to enable a counter 114 which counts for the duration of the output of the monostable. Counter 114 is coupled to a decoder 116 which operates when a minimum duration is reached by the output of the monostable 112. Thus the decoder output will only occur upon receiving a minimum duration 1.8 MHz CW signal. The decoder output is supplied to a window generator 118. The window generator is conventional and may comprise one or more monostables or counters for generating a signal of a given duration in response to an input of appropriate magnitude and polarity. When decoder 116 supplies an appropriate signal to window generator 118, the window generator output enables a pulse width detector circuit 124.

The video is also supplied through another bandpass filter 120 and another comparator 122 to pulse width detector 124. BPF 120 is chosen to allow the comparator 122 to slice the 4.7 microseconds pulse at its center, that is, at about a 50 IRE level. Pulse width detector 124 ignores the 1.8 MHz CW signal since it is not enabled when this signal occurs. It is only enabled during the presence of an output from window generator 118. Consequently, it only responds to signals that fall within the window. When enabled, the pulse width detector 124 will produce an output pulse if a 4.7 microseconds white-going pulse is detected in the video. The pulse output of width detector 124 is supplied to a time out circuit 126. The time out circuit 126 passes a first output pulse from pulse width detector 124 and any other output pulses within a given time period of the first output pulse. After the given time period has elapsed, the time out circuit 126 then blocks any further output pulses until a time period of almost one vertical field has elapsed. The time out circuit 126 provides noise immunity.

During operation, the output of time out circuit 126 consists of nine pulses during the odd field and six pulses during the even field, with each pulse corresponding to the presence of a 1.8 MHz CW signal followed by a 4.7 microseconds white pulse on a black pedestal. These output pulses are used to control the phasing of horizontal pulses which are generated in the receiver. The output of time out circuit 126 is also supplied to a vertical sync circuit consisting of a retriggerable monostable 130 and a counter 132, both of which supply an AND gate 134. Responsive to an output from the time out circuit 126, retriggerable monostable 130 enables counter 132, which counts the output pulses from time out circuit 126. The timing of retriggerable monostable 130 is approximately equal to 1.5 horizontal lines and it provides a window for counting pulses from time out circuit 126. The decode output of the counter 132 selects the exact number of pulses that must be present before a vertical pulse is given at the output of AND gate 134.

In this implementation the occurrence of exactly nine pulses during the window provided by retriggerable monostable 130 identifies the odd field. By default the field between odd fields is the even field. The output of AND gate 134 is supplied to a vertical regenerating circuit (not shown), which may be of conventional construction, for generating vertical sync pulses phased to the output of AND gate 134.

In FIG. 11, a more detailed schematic diagram of the synchronizing signal interval detection circuit is shown. The bandpass filters are numbered 136 and 138 with the comparators being 140 and 142. A retriggerable monostable 144 supplies a pulse width counter 145 consisting of a pair of counters 146 and 148 that are clocked by a clock of frequency Fc which may be derived by dividing down the 4 Fc signal from the PLL in FIG. 4. The counters are arranged to produce an output for a monostable 150 when the appropriate number of pulses have been counted, indicating that the 1.8 MHz CW signal has been present for the requisite period of time, and monostable 150 establishes a window. The output of monostable 150 is used to enable a pulse width detector 151, which comprises two D flip-flops, 152 and 154, and three monostables 156, 158 and 160, having an input from comparator 142. The operation of the pulse width detector 151 is straightforward and the detector generates an output signal when a pulse of appropriate duration (4.7 microseconds) is present in the window. This output signal triggers a time out circuit 161, consisting of monostables 164 and 166, and NAND gate 162. The output signal is supplied to the sync regenerator for phasing the horizontal pulses and also to a retriggerable monostable 168 and a counter 170 for counting nine horizontal pulses for a NAND gate 172 and supplying timing generation circuit 74, both in FIG. 4.

It will be appreciated that the circuits described above operate continuously to detect the identification pulses and determine therefrom the horizontal and vertical synchronizing signals. The noise immunity features mentioned are designed to make the detection process "fail safe", that is, to lock out subsequent pulses once a valid signal has been detected.

What has been described is a novel system for a CATV scrambled signal with compressed digital audio in the horizontal intervals. It is recognized that numerous modifications and changes in the described embodiment of the invention will be apparent to those skilled in the art without departing from its true spirit and scope. The invention is to be limited only as defined in the claims.

What is claimed is:

1. A signal encoding system comprising:
   means for developing a reference signal having regularly spaced zero crossings;
   means for developing a data signal having regularly spaced sampling points from a data source; and
   means for combining the reference signal and the data signal with phasing such that the sampling points of the data signal coincide with zero crossing points of the reference signal.

2. A signal encoding system comprising:
   means for developing a reference signal having regularly spaced zero crossings;
   means for developing a data signal having regularly spaced sampling points and zero energy at the frequency of the reference signal from a data source; and
   means for combining the reference signal and the data signal with phasing such that the sampling points of the data signal coincide with zero crossing points of the reference signal.

3. The system of claim 1 wherein the reference signal has a frequency F and the data signal has data sampling points at a frequency 2F/N, where N is an integer.

4. The system of claim 3 wherein the data signal is of the duobinary or modified duobinary type and has a data rate equal to twice the frequency of the reference signal.

5. A television signal encoding system comprising:
   means for developing a color reference signal having regularly spaced zero crossings;
   means for developing a data signal having regularly spaced sampling points from a data source;
   means for combining the color reference signal and the data signal in the horizontal blanking intervals of a baseband video signal with phasing such that the sampling points of the data signal coincide with zero crossing points of the color reference signal.

6. A television signal encoding system comprising:
   means for developing a color reference signal having regularly spaced zero crossings;
   means for developing a data signal having regularly spaced sampling points and zero energy at the frequency of said color reference signal from a data source;
   means for combining the color reference signal and the data signal in the horizontal blanking intervals of a baseband video signal with phasing such that the sampling points of the data signal coincide with zero crossing points of the color reference signal.

7. The system of claim 5 wherein the data signal is of the duobinary or modified duobinary type and has a data rate equal to twice the frequency of the color reference signal.

8. The system of claim 7 further including a source of video signals, a phase locked loop and a timing signal generator, wherein;

said source of video signals is coupled to said phase locked loop which in turn supplies a reference clock frequency 4 Fc to said signal generator and a frequency of 2 Fc to said data source.

9. The system of claim 8 further including a video encoder for further scrambling said video signals and further including means for combining the output of said video encoder with the output of said data source.

10. A color television signal encoder system for encoding a scrambled color television signal comprising:
   means for developing color reference signal having a frequency Fc;
   means for precoding a data signal to have data sampling points at a frequency 2 Fc/N and zero energy at said frequency Fc, where N is an integer; and
   means for combining said signals in the sync interval of a baseband video signal with sampling points of said data coinciding with zero crossings of said color reference signal.

11. The system of claim 10 wherein said data signal comprises a duobinary or a modified duobinary signal and wherein N is equal to 1.

12. The system of claim 11 wherein said data signal comprises compressed digital audio information.

13. A decoder for decoding a scrambled television signal including video information and horizontal blanking intervals comprising a color reference having regularly spaced zero crossings and data at regularly recurring sample points which are phased to coincide with zero crossings of the reference signal, comprising:
   means for detecting said video information and said data;
   means for forming a sampling signal related to the frequency of said color reference; and
   means for sampling said data at sample points coinciding with zero crossing points of said color reference for separating said data from said color reference.

14. The decoder of claim 13 wherein said data is precoded to have zero energy at said color reference frequency and is characterized by a data rate equal to twice the frequency of said color reference.

15. The decoder of claim 14 further including a phase locked loop, having a frequency of four times said color reference, and horizontal interval detector means, said horizontal interval detector means operating on said received signal and developing a control signal to control operation of said phase locked loop.

16. A decoder for decoding a scrambled television signal comprising:
   phase locked loop means for providing an output frequency equal to four times the frequency of an NTSC color reference;
   horizontal interval detector means responsive to said received signal for providing a control signal for controlling operation of said phase locked loop means;
   video detector means for developing a baseband video signal from said scrambled signal;
   sample means for sampling said baseband video signal at a rate and phase determined by the output frequency of said phase locked loop means, whereby a digital data signal inserted in the horizontal interval of said scrambled signal may be detected without interference by phasing said sampling to occur at zero crossings of said color reference.

17. A CATV signal encoding and decoding system comprising:
   an encoder including means for developing a color reference signal, means for combining a data signal having regularly recurring sampling points with the color reference signal in the horizontal intervals of a baseband video signal with phasing such that the sampling points of the data signal coincide with zero crossing points of the color reference signal; and
   a decoder for decoding the signal from the encoder comprising a video detector for developing said combined signal, horizontal interval detector means for producing a control signal, phase locked loop means having a frequency equal to an integral multiple of the frequency of said color reference signal and being controlled by said control signal from said horizontal interval detector means and sampling means coupled to said phase locked loop means and to said video detector for recovering said data signal, said sampling means being phased such that said combined signal is sampled at zero crossing points of said color reference signal.

18. A CATV signal encoding and decoding system comprising:
   an encoder including means for developing a color reference signal, means for combining a data signal having regularly recurring sampling points and zero energy at the frequency of said color reference signal with the color reference signal in the horizontal intervals of a baseband video signal with phasing such that the sampling points of the data signal coincide with zero crossing points of the color reference signal; and
   a decoder for decoding the signal from the encoder comprising a video detector for developing said combined signal horizontal interval detector means for producing a control signal, phase locked loop means having a frequency equal to an integral multiple of the frequency of said color reference signal and being controlled by said control signal from said horizontal interval detector means and sampling means coupled to said phase locked loop means and to said video detector for recovering said data signal, said sampling means being phased such that said combined signal is sampled at zero crossing points of said color reference signal.

19. The system of claim 18 wherein said data is in a duobinary or modified duobinary format and wherein the sampling frequency of said sampling means is equal to twice the frequency of said color reference signal.

20. The system of claim 19 wherein said data comprises binary coded compressed digital audio.

21. The method of formatting a signal comprising the steps of:
   providing a reference signal having regularly spaced zero crossings; and
   combining said reference signal with a data signal having regularly spaced sampling points with phasing such that the sampling points of the data signal coincide with zero crossings of the reference signal.

22. The method of formatting a signal comprising the steps of:
   precoding arbitrary binary data into a data signal having regularly spaced sampling points and zero energy at a selected frequency; and
   combining said data signal with a clock signal of said selected frequency with phasing such that the sampling points of the data signal coincide with zero crossings of the clock signal.

23. The method of claim 21 wherein said data signal is precoded into a duobinary or modified duobinary format having a data rate equal to twice the frequency of the clock signal.

24. The method of claim 23 wherein said clock signal is a color reference signal and said data signal is digital audio.

25. The system of claim 6, further including:
means for generating an identifier signal;
means for generating a preselected video signal a predetermined time before said identifier signal; and
means for inserting said identifier signal and said preselected video signal in the vertical blanking interval of said baseband video signal.

26. The system of claim 25 wherein said identifier signal is a white pulse of approximately 4.7 microseconds duration and said preselected video signal is a 1.8 MHz continuous wave of approximately 35 microseconds duration.

27. The system of claim 26 wherein said identifier signal and said preselected video signal are inserted on a plurality of successive lines in said vertical blanking interval.

28. The system of claim 27 wherein the number of successive lines of said identifier signal and said preselected video signal is used to determine the particular field of the baseband video signal.

* * * * *